Dec. 10, 1968        A. G. DEAN         3,415,168
DISK BRAKE APPARATUS
Filed April 21, 1967                 2 Sheets-Sheet 1

INVENTOR.
ALBERT G. DEAN
BY William R. Nolte
AGENT

INVENTOR.
ALBERT G. DEAN
BY William R. Nolte
AGENT

United States Patent Office 3,415,168
Patented Dec. 10, 1968

3,415,168
DISK BRAKE APPARATUS
Albert G. Dean, Narberth, Pa., assignor to The Budd Company, Philadelphia, Pa., a corporation of Pennsylvania
Filed Apr. 21, 1967, Ser. No. 632,598
2 Claims. (Cl. 92—30)

ABSTRACT OF THE DISCLOSURE

Disk brake apparatus for railway passenger cars including an air actuated cylinder for moving brake shoes into engagement with a rotating disk. An air piston cylinder having a primary piston cylinder with a telescoping spring loaded secondary cylinder cooperating therewith actuates a pair of brake shoes into engagement with a rotating disk. An elastic fricton ring grips the exterior surface of the primary piston-cylinder and requires a greater force than can be exerted by the coil spring to move the friction ring relative to the primary cylinder. When air is released from the cylinder during the nonduty cycle of the brake, the coil spring reacts through the primary piston cylinder and elastic friction ring to exert a force on the brake shoes so that the same lightly drag the rotating disk at all times.

---

This invention relates to improved railway disk brake apparatus, and more particularly, to automatically operated brake apparatus for applying brake shoe forces to a brake disk during the nonduty cycle of the apparatus.

During wet, and under adverse winter weather conditions, the formation of a film of water or ice on a rotating brake disk precludes the best possible braking performance of the braking apparatus employed. These conditions have given rise to solutions calling for the incorporation of metallic particles in the brake linings in attempts to obtain better gripping action. In one such solution the piston of the air cylinder initially moves the brake shoes adjacent to the rotating disk to remove the film of water or ice and thereafter exerts a subsequent continuing motion to clamp the shoes into gripping engagement with the rotating disk to arrest its rotation. Upon release of the air in the cylinder the piston is restored to its initial starting position in which the brake shoes are spaced from the rotating disk thereby enabling subsequent build-up of film of water or ice.

By contrast other approaches to solve the problems of wet and iced friction surface operations have employed an automatic brake dragging principle in which a continuous light shoe force is maintained through the use of a high friction seal. In one such arrangement the friction seal grips the cylinder wall of the apparatus and normally urges the lining into engagement with the disks. The continuous shoe force that is desired after brake release is produced by the flexibility or rubber in the mechanical actuating system. Due to tracking problems of the wheels including lateral movement of the axles carrying the disks, and warpage or nonplanar rotation of the brake disks, the friction ring when employed alone has been found unsatisfactory due to the fact that "knockback" forces tend to shift the friction ring relative to the cylinder wall of the actuating linkage so that the brake linings do not drag the disks.

It is the principle object of this invention therefore to provide an improved brake apparatus in which the brake shoes are maintained in continuous contact with the rotating disk and which avoids one or more of the disadvantages of the prior art arrangements.

It is another important object of this invention to provide an improved disk brake apparatus in which the brake linings thereof are maintained in constant shoe force contact with the rotating disk and result in a single full piston stroke per shoe life of the apparatus.

For a better understanding of the invention together with other and further objects thereof, reference is had to the accompanying drawing and its scope will be pointed out in the appended claims.

Figure 1:
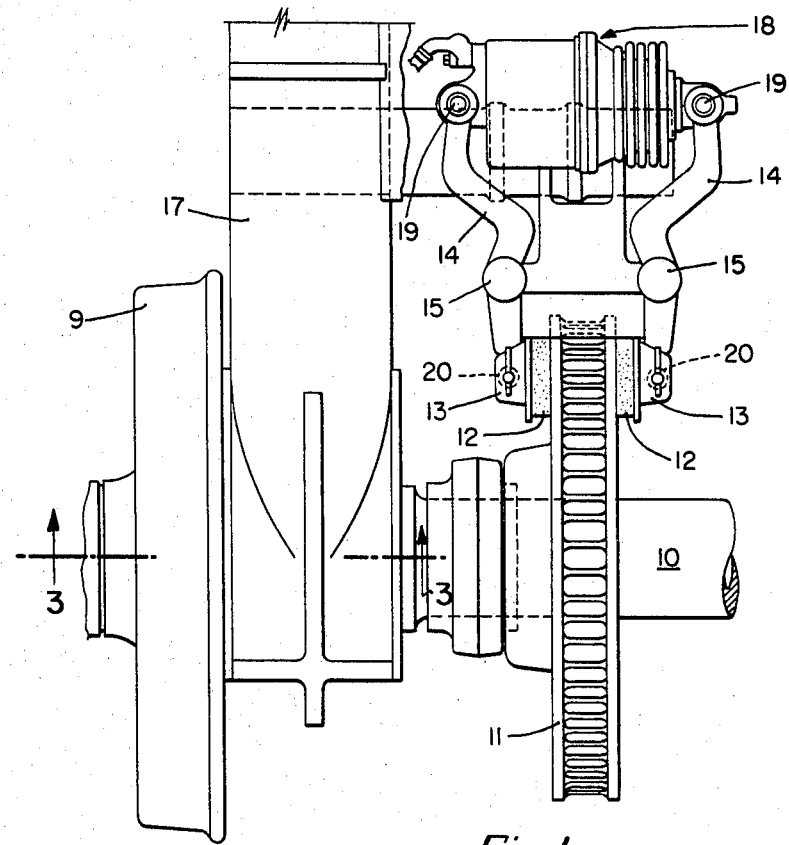
FIG. 1 is a top plan view of disk brake apparatus embodying the present invention.
Figure 3:
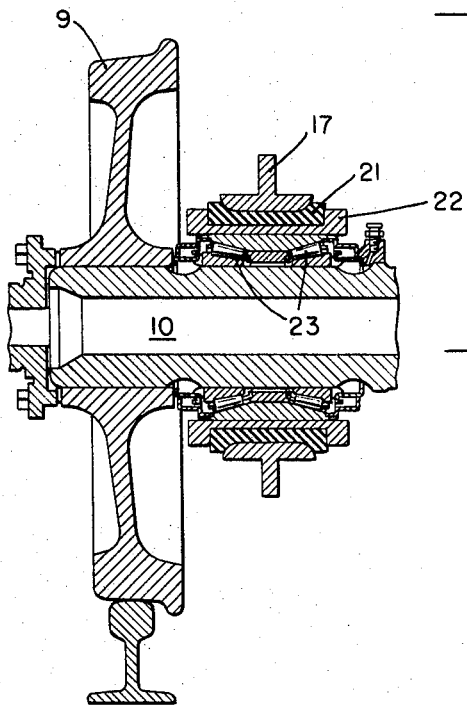
FIG. 3 is a sectional view taken along the line 3—3 of FIG. 2.

Referring now to the general arrangement of the apparatus as seen in FIG. 1, there is shown a truck wheel-axle unit for a railway passenger vehicle having a wheel 9, with a brake disk 11, secured fast on the axle 10. Brake shoe lining pads 12 mounted in and carried by brake shoes 13 are provided for acting against opposite surfaces of the disk. Brake operating levers or tongs 14 are pivoted at 15 on a mount 16 carried by a truck side frame 17 of the truck. The brake shoes 13 are pivoted to the inner ends of tongs 14 by means of pivot pins 20. A brake operating motor or air cylinder assembly 18 is carried by the outer extremities of tongs 14 by pivot pins 19. As seen in FIG. 3, axle 10 may be mounted for slight universal movement within a joint of truck frame 17 by the provision of an elastic resilient layer 21 of rubber-like material such as neoprene which is disposed between a tubular bearing retainer housing 22, carrying bearings 23, and the side frame of the truck.

Figure 2:
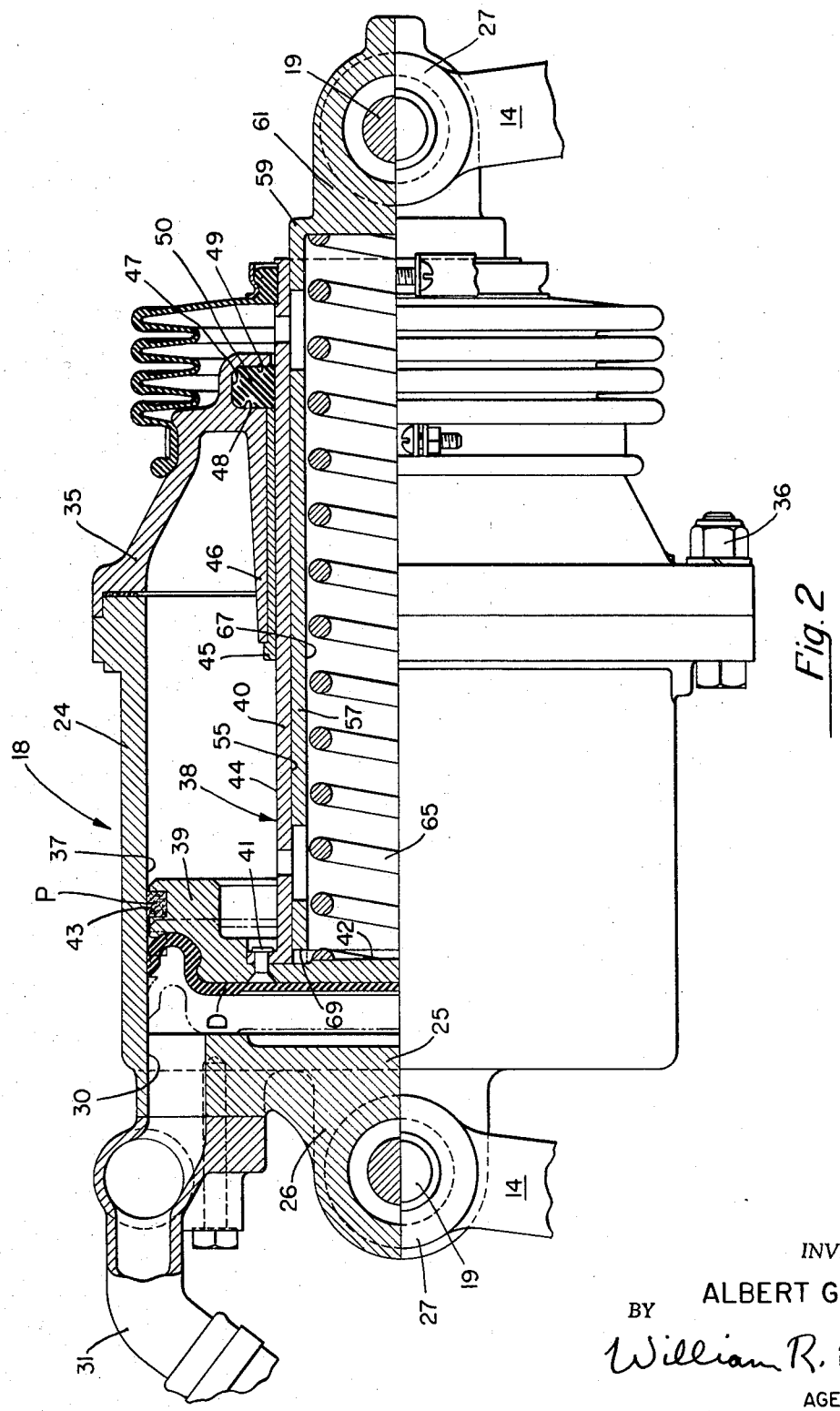
FIG. 2 is an enlarged partial plan and axial sectional view of the brake air cylinder shown in FIG. 1.

In accordance with the present invention, as particularly shown in FIG. 2, the motor unit 18 includes a cylinder 24 having a head end or bottom wall 25 with a boss portion 26 which receives bushing 27 to accommodate the aforementioned pivot 19. The bottom wall also defines an aperture 30 to receive air hose 31 connected with a suitable supply of air under pressure. A cover 35 engaged the opposite end of the cylinder 24 and is secured thereon by suitable bolts as at 36. The cylinder 24 defines an interior chamber 37 within which rides piston-cylinder means 38. The latter consists of an annular piston head 39, and an elongated sleeve 40, constituting a rod which is secured as by rivets 41 to the inner face 42 of the piston 39. A swab P is received within an annular groove 43 of piston head 39 to lubricate the inner face of chamber 37. A packing cup D coacts with the other face of piston 39 and chamber 37. The outer cylindrical surface 44 of the hollow sleeve 40 rides in a suitable bronze bushing 45 pressed in an inturned elongated sleeve like portion 46 defining an opening within cover 35. The cover 35 also defines an annular recess 47 adjacent to the sleeve like portion and includes parallel side surfaces 48, 49 normal to the axis of sleeve 40.

In order to retain piston-sleeve 39, 40 in its extended position after release of air to the brake cylinder an elastic friction ring 50 is received within the annular opening and grips the external sleeve surface 44 in tight peripheral engagement. The piston rod sleeve 40 defines a cylinder having an internal bore 55 which telescopically receives a secondary cylinder 57 having an inner end which is open, and an outer head or closed end 59 which includes a boss portion 61 suitably apertured to receive the aforementioned bushing 27 and pivot 19. A coiled spring 65 is received within bore 67 of secondary cylinder member 57 and bottoms at one of its end on the head end wall 59 and at its other end on inner face 42 of piston head 39. The coil spring 67 is operative to urge the pair of tongs 14 to pivot outwardly in a direction to cause brake lining 13 to apply a continuous drag force on the brake disk.

In operation and prior to the first duty cycle of the air sleeve motor 18, the piston head 39 of piston-cylinder 39, 40 is located to the extreme left as shown in the phantom line illustration thereof indicated in FIG. 2. Also in this pre-operation state the open end or marginal edge 69 of the secondary cylinder member 63 bottoms upon the inner face 42 of piston head 39, also indicated in phantom. Upon initiation of the first duty cycle a supply of air under pressure is introduced into the air cylinder which causes the piston head 39 and secondary cylinder 63 to move in unison to the right, as seen in FIG. 2. Such movement is effective to take up the slack which may be present in the operating elements for example by virtue of dimensional tolerances existing between the brake shoes 13 and tongs 14, pivots 15 mounting the tongs to frame 16, and lateral movement of axle 10 relative to its supporting truck frame.

Further movement of sleeve 40 to the right causes elastic friction ring 50 to slide relative to outer surface 44 until brake lining pads 12 are in tight engagement with brake disk 11 to achieve desired braking action. This motion causes elastic ring to be urged and to be deformed in compression against the right side face 49 of annular groove 47. Upon completion of the braking action and upon release of the air from the system the deformed resilient ring 50 springs back due to its flexibility leftwardly to an undeformed state and releases much of the pressure on the brake linings. The coiled spring 65, however, is effective to apply a force axially outward of the air cylinder 18 to maintain a light constant drag of the linings on the brake disk. Any irregular lateral movement of the axle 19 in the form of knockback or nonplanar rotation of the disk 10 is accommodated by the coil spring 65. It is to be noted that the force required to accomplish movement of the elastic friction ring 50 axially along the exterior surface 44 of piston sleeve 40 exceeds the pressure which can be exerted by the coiled spring 63. Thus, spring 63 reacting with its one end against piston 39, and with the motion of piston-sleeve 39, 40 arrested by elastic friction ring 50, engages with its other end the closed end 59 of inner cylinder 57. The latter cylinder is thereby caused to telescope outwardly to produce a continuing drag action of the linings on the disk irrespective of "knockback" movements.

It should be further noted that a piston return spring is eliminated in that it is not necessary that the primary piston 39 be returned into facing engagement with the head end 25 of the primary cylinder chamber 24. Thus the piston 39 undergoes or travels only a single full piston stroke during the entire life of the brake shoe linings.

While there has been described what at present is considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. Brake apparatus for applying continuous drag forces to a rotating disk, comprising in combination, outer cylinder means having a chamber head end and fluid pressure connection, a piston-sleeve means defining an elongated cylinder chamber with an annular piston head at one end relatively movable fitting in said outer chamber, friction means interposed between said outer cylinder means and gripping the other end of said piston-sleeve means, inner cylinder means having a head end and power connection means mounted for movement within said elongated cylinder chamber, and resilient means mounted within said inner cylinder means and coacting with said annular piston head to continuously urge said inner cylinder means and piston head apart, the force required to move said piston-sleeve means relative to said friction means gripping same exceeds the force required to compress said resilient means mounted within said inner cylinder means.

2. Apparatus as set forth in claim 1 wherein said resilient means constitutes a coiled spring.

References Cited

UNITED STATES PATENTS

| 825,866 | 7/1906 | Rogers | 92—84 X |
| 1,097,632 | 5/1914 | Holmes | 92—129 X |
| 2,101,021 | 12/1937 | Daly | 92—84 X |
| 2,279,251 | 4/1942 | Scott-Iversen | 60—54.65 |
| 2,395,018 | 2/1946 | Sherman | 92—84 X |
| 2,746,254 | 5/1956 | Lucien | 60—54.6 |
| 2,985,140 | 5/1961 | Fagge | 92—113 X |
| 3,277,983 | 10/1966 | Jeffries | 188—196 |

MARTIN P. SCHWADRON, *Primary Examiner.*

IRWIN C. COHEN, *Assistant Examiner.*

U.S. Cl. X.R.

92—84, 113; 188—196; 60—54.6